(12) United States Patent
Warren et al.

(10) Patent No.: US 7,813,360 B2
(45) Date of Patent: Oct. 12, 2010

(54) CONTROLLING DEVICE ACCESS FAIRNESS IN SWITCHED FIBRE CHANNEL FABRIC LOOP ATTACHMENT SYSTEMS

(75) Inventors: Bruce Gregory Warren, Costa Mesa, CA (US); Carl Joseph Mies, Costa Mesa, CA (US); Thomas Phillip Ambrose, Costa Mesa, CA (US); Terrence R. Doherty, Costa Mesa, CA (US)

(73) Assignee: Emulex Design & Manufacturing Corporation, Costa Mesa, CA (US)

( * ) Notice: Subject to any disclaimer, the term of this patent is extended or adjusted under 35 U.S.C. 154(b) by 781 days.

(21) Appl. No.: 11/044,444

(22) Filed: Jan. 26, 2005

(65) Prior Publication Data

US 2006/0165115 A1 Jul. 27, 2006

(51) Int. Cl.
*H04L 12/28* (2006.01)
*H04L 12/56* (2006.01)
*G01R 31/08* (2006.01)
*G06F 11/00* (2006.01)
*G08C 15/00* (2006.01)
*H04J 1/16* (2006.01)
*H04J 3/14* (2006.01)
*H04L 1/00* (2006.01)
*H04L 12/26* (2006.01)

(52) U.S. Cl. ........................ 370/412; 370/416
(58) Field of Classification Search ............... 370/442, 370/461, 462, 347, 320, 401, 384, 282, 254, 370/372, 388, 353, 395, 399, 258, 235
See application file for complete search history.

(56) References Cited

U.S. PATENT DOCUMENTS

| | | | | |
|---|---|---|---|---|
| 4,809,270 | A * | 2/1989 | Baxter et al. | 370/458 |
| 5,511,070 | A * | 4/1996 | Lyles | 370/411 |
| 5,768,257 | A * | 6/1998 | Khacherian et al. | 370/229 |
| 5,805,577 | A * | 9/1998 | Jain et al. | 370/234 |
| 5,991,268 | A * | 11/1999 | Awdeh et al. | 370/236.1 |
| 6,108,306 | A * | 8/2000 | Kalkunte et al. | 370/235 |
| 6,463,484 | B1 * | 10/2002 | Moss | 710/36 |
| 6,779,043 | B1 * | 8/2004 | Crinion | 709/249 |
| 6,901,050 | B1 * | 5/2005 | Acharya | 370/230.1 |

(Continued)

OTHER PUBLICATIONS

Author Unknown, Internetworking Technologies Handbook, Fourth Edition, Cisco Press, Sep. 11, 2003, pp. 1-12.*

(Continued)

*Primary Examiner*—Daniel J Ryman
*Assistant Examiner*—Christopher Crutchfield
(74) *Attorney, Agent, or Firm*—Morrison & Foerster LLP (57) ABSTRACT

Embodiments of the present invention are directed to controlling device access fairness in frame-based switches by automatically and continuously counting the number of actively communicating devices connected to each port and the type of devices connected to each port, and adjusting fairness accordingly. During a sampling window, the number of active devices and the type of devices connected to each port is determined. At the start of each fairness window, a weighted number of slots are assigned to each port based on the number of active devices connected to each port and the type of devices connected to that port. Within a single fairness window, each port is able to provide device accesses to the frame-based switch in accordance with the number of slots assigned to that port.

20 Claims, 6 Drawing Sheets

U.S. PATENT DOCUMENTS

| | | | |
|---|---|---|---|
| 2002/0018489 A1* | 2/2002 | Ambe et al. | 370/475 |
| 2003/0007452 A1* | 1/2003 | Gorti et al. | 370/229 |
| 2003/0021239 A1* | 1/2003 | Mullendore et al. | 370/276 |
| 2004/0085974 A1* | 5/2004 | Mies et al. | 370/406 |
| 2004/0085994 A1* | 5/2004 | Warren et al. | 370/462 |
| 2008/0239957 A1* | 10/2008 | Tokura et al. | 370/235 |

OTHER PUBLICATIONS

G. Kramer, A. Banerjee, N.K. Singhal, B. Mukherjee, S. Dixit, S. and Y. Ye, Fair queuing with service envelopes (FQSE): a cousin-fair hierarchical scheduler for Ethernet PONs, Optical Fiber Communication Conference, 2004, pp. 1497-1513, Feb. 2004.*

Alan Demeres, Analysis and Simulation of a Fair Queuing Algorithm, Proceedings of ACM SIGCOMM' 89, Austin, USA, 1989, pp. 1-12.*

* cited by examiner

CONTROLLING DEVICE ACCESS FAIRNESS IN SWITCHED FIBRE CHANNEL FABRIC LOOP ATTACHMENT SYSTEMS

BACKGROUND OF THE INVENTION

1. Field of the Invention

The present invention relates, generally, to device access fairness, and in particular embodiments, to control of device access fairness in switched Fibre Channel (FC) fabric loop attachment systems.

2. Description of Related Art

Figure 1:
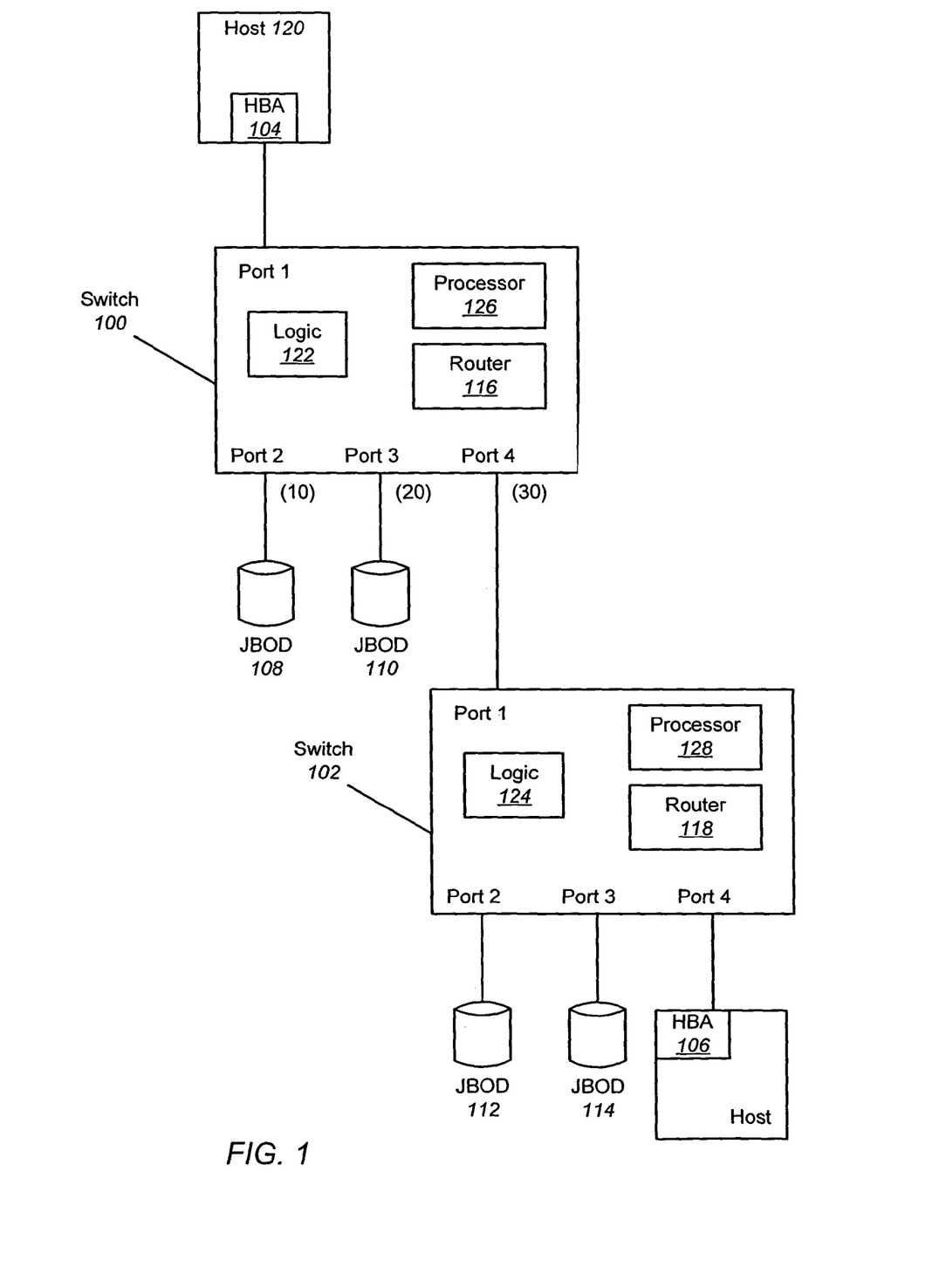
FIG. 1 is an exemplary interconnection diagram of a storage system utilizing non-blocking frame-based crossbar switches for implementing embodiments of the present invention.

As illustrated in the exemplary interconnection diagram of a storage system shown in FIG. 1, non-blocking frame-based crossbar switches (e.g. frame-based switches 100 and 102) enable the "fabric" interconnection of a large number of devices such as Host Bus Adapters (HBAs) 104 and 106, and groups of disk drives referred to as Just a Bunch Of Disks (JBODs) 108, 110, 112 and 114. The devices are connected to ports in the frame-based switches 100 and 102. For example, in FIG. 1, HBA 104 is connected to Port 1 on frame-based switch 100, JBOD 108 is connected to Port 2, JBOD 110 is connected to Port 3, and frame-based switch 102 is connected to Port 4.

Note that unlike FC arbitrated loop (AL) storage switches, which utilize an 8-bit Arbitrated Loop Protocol Address (ALPA), have a 126 device limit, connect and switch loop devices that must share the bandwidth, and cannot be connected to any other storage switch, frame-based switches utilize a 24-bit address (which includes 8-bit domain and area fields in addition to an 8-bit ALPA), have a much higher device limit, and connect and switch devices that do not have to share the bandwidth. Frame-based switches also support loop devices, such as disk drives in a JBOD connected via a port, and can also be connected to other frame-based switches via an inter-switch link.

The various devices connected to a frame-based switch communicate with other devices through the frame-based switch. For example, HBA 104 (through Port 1) may transmit one or more FC frames to Port 1 on frame-based switch 100, essentially containing a request that data be retrieved from, or sent to, each drive in JBOD 108 (through Port 2), each drive in JBOD 110 (through Port 3), each drive in JBOD 110 (through Port 3), and each drive in JBODs 112 and 114 (through Port 4). Port 1 converts these frames into a request for router 116, which includes the source and destination addresses for the data transfer.

If, for example, the router 116 receives a request for a connection from the HBA 104 to a drive in JBOD 108 and is able to make the appropriate connection, then after the drive receives the FC frame from the HBA 104, the drive may send back a response intended for HBA 104 that contains some of the requested data (e.g. a 2 kByte block of data), or a response indicating that the write operation to that drive is now complete. If connections are also made to drives in other ports, similar responses may be sent back by those drives connected to the other ports. It should be understood that the communications described above are only representative of the types of requests and responses that may be issued by the devices, and that other housekeeping requests and responses, such as a Loop Initialization Protocol (LIP) ordered set, may also be issued by the devices. In any case, because the connections needed to facilitate these requests and responses usually cannot be made at the same time (due to contention for the same ports), many of these requests and responses will not be processed immediately, but rather will remain pending or outstanding for a period of time. Routers 116 and 118 are used to receive and arbitrate these requests and responses from the devices, and then configure the frame-based switch 100 to make the connections necessary to give access to devices on ports according to a fairness scheme. Once a device is given access, it can send the request or response.

In conventional AL storage switches connected to a relatively small number of devices, and in particular when the same number of devices are connected to each port, arbitration may be performed using a simple round-robin fairness scheme wherein the ports in the AL storage switch are given access one at a time, and a single request or response from a device would be transmitted through a particular port when that port had been given access. However, if each port is connected to a different number of devices, such as in the frame-based switch example of FIG. 1, this simple round-robin scheme generally does not provide a fair arbitration scheme. For example, assume that Port 2 in frame-based switch 100 is connected to 10 drives (see values in parentheses in FIG. 1) in JBOD 108, Port 3 is connected to 20 drives in JBOD 110, and Port 4 is connected to 30 drives (10 drives in JBOD 112 and 20 drives in JBOD 114). If HBA 104 wants to access each drive, then giving each port one opportunity for access at a time will generally be unfair, because Port 4 will have three times as many drives sending responses back as Port 2, yet both Port 4 and Port 2 are given the same number of access opportunities. With a simple round-robin fairness scheme, drives connected to Port 4 would be "starved," while devices connected to Port 2 would be frequently given access for their requests. If the cascade of frame-based switches in the example of FIG. 1 were continued downward, and a simple round-robin fairness scheme was used for each frame-based switch, devices connected to lower frame-based switches would be starved even more than the devices connected to frame-based switch 102. Not only will bandwidth be severely reduced for the starved devices, but some devices will assume that a malfunction has occurred, and will attempt to reset the entire system. Furthermore, conventional arbitration schemes to not account for different device types. For example, an initiator such as a host computer 120 connected to HBA 104 or a tape drive (not shown in FIG. 1) may have requests that are entitled to higher priority than responses being sent from a disk drive in JBOD 108, but conventional arbitration schemes do not recognize these device-based priority differences.

Therefore, there is a need to control device access fairness in frame-based switches to account for the number of active devices (devices actively transferring data) connected to each port, and the type of devices connected to each port.

SUMMARY OF THE INVENTION

The present invention is directed to controlling device access fairness in frame-based switches by automatically and continuously counting the number of active devices connected to each port and the type of devices connected to each port, and adjusting fairness accordingly. During a sampling window, the number of active devices and the type of devices connected to each port are determined. At the start of each fairness window, a weighted number of slots are assigned to each port based on the number of active devices connected to each port and the type of devices connected to that port. Within a single fairness window, each port is able to provide device accesses to the frame-based switch in accordance with the number of slots assigned to that port.

For each port, and for a period of time referred to as a sampling window, the frame-based switch maintains a table of domain and area addresses for requests or responses coming in from that port, and a device bitmap associated with each domain and area address in the table. Each bit in the device bitmap represents a device associated with that particular domain and area address. When a request or response is received at the frame-based switch via a particular port, the domain and area are compared to domains and areas already stored in the table. If a match is found, then the ALPA associated with the domain and area is put through a hash table to determine a particular bit in the device bitmap associated with that ALPA. That bit is asserted (set) if it was not previously set. If the domain and area of the request or response do not match any domain and area stored in the table, then the domain and area are added to the table, and the ALPA associated with the domain and area is put through the hash table to determine the particular bit in the device bitmap associated with that ALPA. That bit is asserted.

Additionally, when a request is received by a port, information in the frame will indicate if the requestor is an initiator locally attached to the port. If the frame is of a type that indicates that the requestor is a locally attached initiator, a current initiator register specific to that port will be set.

Requests are processed as described above for each port in the frame-based switch for one complete sampling window. The length of a sampling window is programmable. At the end of each sampling window, the number of active devices on each port during that sampling window is computed. At the end of each sampling window, all of the ones in the present sampling window bitmaps for each port are summed together, and the sum, which represents the total number of active devices on that port during the last sampling window, is stored in an active device count register. In addition, the value in the current initiator register is moved to a previous initiator register. The information stored in the active device count register and the previous initiator register for each of the ports in a frame-based switch is utilized at the end of each fairness window to generate a source port/destination port slot allocation.

To generate a source port/destination port slot allocation, the source port is initially allocated a fixed number of slots A (e.g. one slot). If the source port is connected to a locally attached initiator, the source port is allocated an additional fixed number of slots B (e.g. five slots). An additional allocation C is computed based on the number of active devices for the source port. For example, a lookup table or a multiplication factor programmable by firmware may be used to convert the number of active devices on the source port to an additional number of slot allocations C. An additional allocation D may be added using a tweak register programmable by firmware. For every source port/destination port pair (other than a drive/drive source port/destination port pair), the final source port/destination port slot allocation 408 is computed as A+B+C+D. In addition, because the frame-based switch knows that a drive/drive source port/destination port pair will typically not occur in practice, those source port/destination port pairs will receive only the initial allocation A plus any allocation from the tweak register D.

After the final source port/destination port slot allocation has been determined for each source port/destination port combination, the router in the frame-based switch uses this slot allocation information while making source port/destination port connections on generally a first-come, first-served basis. Every time a source port/destination port connection is made, the router decrements the source port/destination port slot allocation by one. When the source port/destination port slot allocation reaches zero, no further source port/destination port connections can be made during the remainder of the fairness window. If the connection cannot be made for this reason or any reason, the request or response is placed in a queue for processing at a later time.

DETAILED DESCRIPTION OF PREFERRED EMBODIMENTS

In the following description of preferred embodiments, reference is made to the accompanying drawings that form a part hereof, and in which is shown by way of illustration specific embodiments in which the invention may be practiced. It is to be understood that other embodiments may be utilized and structural changes may be made without departing from the scope of the preferred embodiments of the present invention.

Embodiments of the present invention are directed to controlling device access fairness in frame-based switches by automatically and continuously counting the number of active devices (devices actively transferring data) connected to each port and the type of devices connected to each port, and adjusting fairness accordingly. During a sampling window, the number of active devices and the type of devices connected to each port are determined. At the start of each fairness window, a weighted number of slots are assigned to each port based on the number of active devices connected to each port and the type of devices connected to that port. Within a single fairness window, each port is able to provide device accesses to the frame-based switch in accordance with the number of slots assigned to that port.

Figure 2:
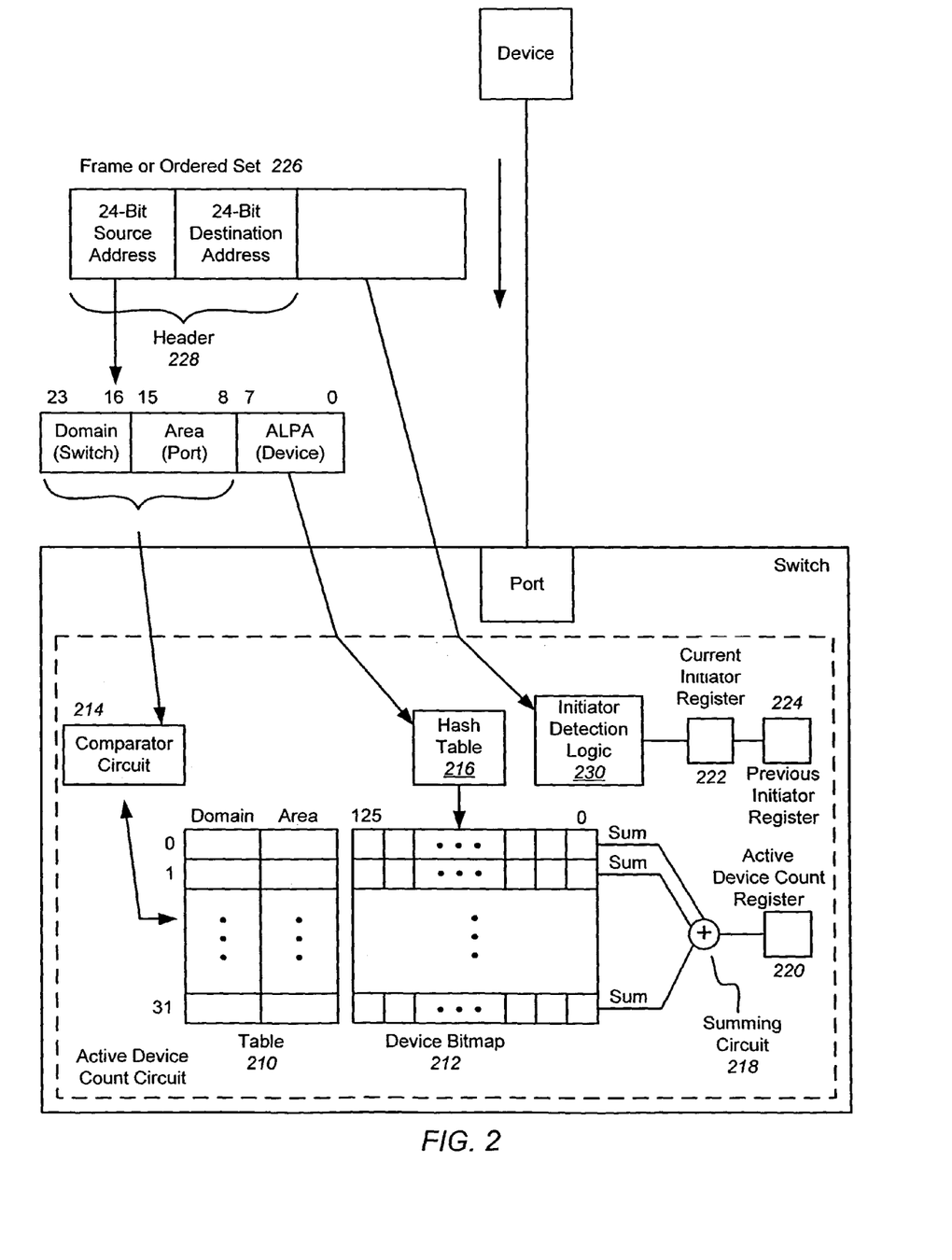
FIG. 2 illustrates the counting of active devices and the identification of initiators on a per-port basis according to embodiments of the present invention.

FIG. 2 illustrates the counting of active devices on a per-port basis according to embodiments of the present invention. In FIG. 2, a request or response sent by a device and received at a port will be in the form of a FC frame or ordered set 226 that includes a header 228 containing a 24-bit source address 200 and a 24-bit destination address 202. Both the 24-bit source address 200 and the 24-bit destination address 202 are comprised of an 8-bit domain address 204 in the most significant bits (MSBs) that identifies a particular frame-based switch, an 8-bit area address 206 that identifies a particular port on that frame-based switch, and an 8-bit ALPA 208 in the least significant bits (LSBs) that identifies a particular device on that port. Note that the FC frames shown in FIG. 2 and described herein are for purposes of illustration only, and that embodiments of the present invention are applicable to other protocols whose frames have similar addressing information.

For each port, and for a period of time referred to as a sampling window, the frame-based switch updates an active device count circuit including a table 210 of domain and area addresses for requests or responses coming in on that port (i.e. the domain and area addresses 204 and 206 contained in the source address 200 of FC frames 226 sent to the port by devices attached to that port), and a device bitmap 212 associated with each domain and area address in table 210. Each bit in the device bitmap 212 represents a device associated with that particular domain and area address (i.e. a device connected to a particular port on a particular frame-based switch). In one embodiment of the present invention, the device bitmap is 126 bits long, which corresponds to the 126 device limit for FC_AL storage switches. Note that although FIG. 2 illustrates only one port and one active device count circuit, each switch employs multiple ports.

When a request or response is received at the frame-based switch via a particular port, the domain 204 and area 206 are compared (see reference character 214) by a comparator circuit to domains and areas already stored in table 210. If a stored domain and area are found in table 210 that match the domain 204 and area 206 of the request or response, then active device count circuit applies the ALPA 208 associated with the domain 204 and area 206 to a hash table 216 to determine a particular bit in the device bitmap 212 associated with that ALPA 208. That bit is asserted (set) if it was not previously set. If the domain 204 and area 206 of the request or response do not match any domain and area stored in table 210, then the comparator circuit adds the domain 204 and area 206 to table 210, and the ALPA 208 associated with the domain 204 and area 206 is put through the hash table 216 to determine the particular bit to set in the device bitmap 212 associated with that ALPA 208.

Additionally, when a request is received by a port, the type of frame as well as the address field information 226 will indicate if the requester is an initiator locally attached to the port. (Note that initiators send certain frames that are usually not sent by target devices.) If the frame 226 is of a type that indicates that the requestor is a locally attached initiator, such as a Small Computer System Interconnect (SCSI) FCP frame (Fibre Channel Protocol which is the mapping of SCSI-3 to FC), a PRocess LogIn (PRLI) frame or some other frame type, a single domain 204 and area 206 will be stored in table 210, and single bit in the device bitmap 212 will be asserted representing the initiator. In addition, logic 230 will detect that the frame 226 is from a locally attached initiator, and a current initiator register 222 specific to that port will be set.

In the example of FIG. 1, Port 1 of frame-based switch 100 will have a table comprised of only one domain and area address representing switch 100 and Port 1, respectively, and a single asserted bit would appear in the device bitmap representing the initiator HBA 104. Port 2 of frame-based switch 100 will also have a table comprised of only one domain and area address representing switch 100 and Port 2, respectively, and an asserted bit would appear in the device bitmap for each of the active devices in JBOD 108. However, Port 4 of frame-based switch 100 in FIG. 1 may have a table 210 comprised of three domain and area address entries, one each for switch 102 and Port 2, switch 102 and Port 3, and switch 102 and Port 4. The domain and area address entry for switch 102 and Port 2 would contain a device bitmap having an asserted bit for every active device in JBOD 112, the domain and area address entry for switch 102 and Port 3 would contain a device bitmap having an asserted bit for every active device in JBOD 114, and the domain and area address entry for switch 102 and Port 4 would contain a device bitmap having a single asserted bit representing initiator HBA 106.

Figure 3:
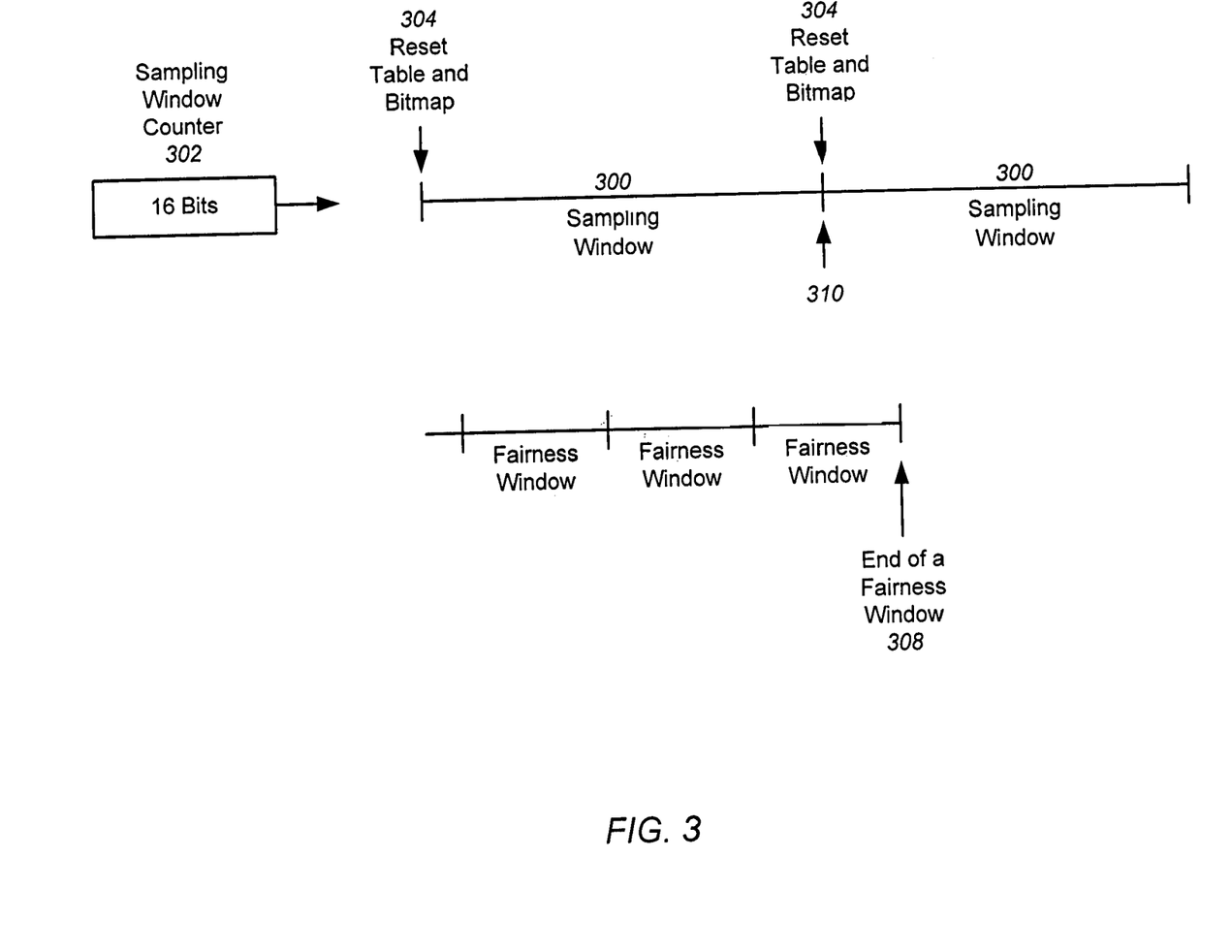
FIG. 3 illustrates successive sampling windows, the timeline for gathering active device information on a per-port basis, and fairness windows which determine when the active device information is utilized according to embodiments of the present invention.

FIG. 3 illustrates successive sampling windows 300 and the timeline for gathering active device information on a per-port basis according to embodiments of the present invention. Requests are processed as described above for each port in the frame-based switch for one complete sampling window 300. Sampling windows are provided to account for changes to the number of active devices being accessed through a port. If devices connected to a port are either removed from the port or not accessed over time, the sampling windows 300 enable the present invention to take note of those changes and adjust device access fairness accordingly. The length of a sampling window is programmable. For example, a 16-bit sampling window counter 302 may be used to count off the length of the sampling window, where each increment of the 16-bit sampling window counter 302 occurs at a fixed time interval (e.g. 1 millisecond).

At the end of each sampling window 304, the number of active devices on each port during that sampling window is computed. Referring again to FIG. 2, at the end of each sampling window, all of the ones in the present sampling window bitmaps for each port are summed together (represented symbolically at 218), and the sum, which represents the total number of active devices on that port during the last sampling window, is stored in an active device count register 220. In addition, the value in the current initiator register 222 is moved to a previous initiator register 224. The purpose of the active device count register 220 and the previous initiator register 224 is to store the outcome of the current sampling window so that new data can be gathered during the next sampling window. After these values are stored, the table 210, device bitmaps 212, and current initiator register 222 for all ports in the frame-based switch are then cleared for use in the next sampling window. Note that either an initiator or a number of active devices will be connected to a port, but not both. Thus, if there are active devices connected to the port, the active device count register 220 will be nonzero, and the current initiator register 222 will be reset. Conversely, if an initiator is connected to the port, the current initiator register 222 will be set, and the active device count register 220 will be set to one.

Note that if a value of zero is stored in the sampling window counter (see reference character 302 in FIG. 3), then the sampling window never closes. In this case, every device that sends a request or response is counted as an active device as described above and illustrated in FIG. 2. Therefore, during system initialization when each device communicates housekeeping messages or responses as part of an initialization procedure, all devices will be counted as active devices, and fairness will be based on the total number of devices connected to each port, whether they are actively being accessed or not.

It should be noted that in most cases, a sampling window will be much longer than a fairness window, to capture active device information over a statistically significant amount of time. Thus, many consecutive fairness windows may use the same information to generate a source port/destination port slot allocation until the sampling window closes and new information is made available. In the special case where the sampling window never closes, the information stored in the active device count register and the current initiator register for each of the ports in a frame-based switch is used immediately upon the ending of a fairness window to generate the source port/destination port slot allocation.

Referring again to FIG. 3, the information stored in the active device count register and the previous initiator register for each of the ports in a frame-based switch is utilized at the end of each fairness window 306. For example, when a fairness window ends at time 308, the information stored in the active device count register and the previous initiator register (which was last updated at time 310) is used to generate a slot allocation.

Figure 4:
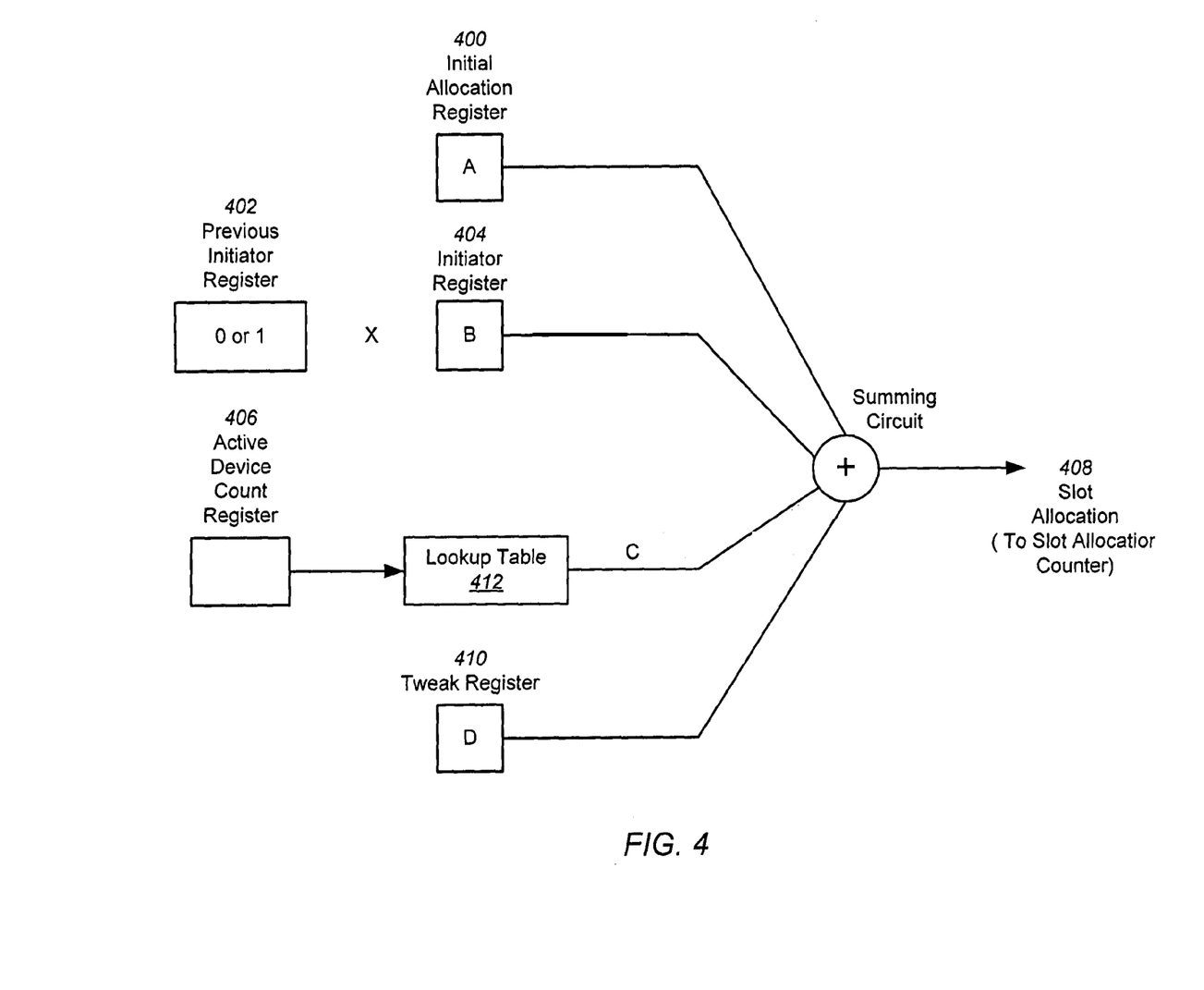
FIG. 4 illustrates the computation of the source port/destination port slot allocation for a single source port and a single destination port according to embodiments of the present invention.

In one embodiment of the present invention described above, all initiators are assumed to access all ports evenly. In this embodiment, one table and bitmap illustrated in FIG. 2 is maintained for each port, and the destination address in each received frame is ignored. The active device count for each port within a sampling window is utilized to generate the slot allocation. FIG. 4 is a symbolic illustration of an exemplary slot allocation circuit for computing the slot allocation for each port according to this embodiment. At the beginning of a fairness window, the source port is initially allocated a fixed number of slots A (e.g. one slot). This value of A may be stored in an initial allocation register 400 programmable by firmware. If the source port is connected to a locally attached initiator, the previous initiator register (see reference character 224 in FIG. 2 and 402 in FIG. 4) will be set to a logic one and the source port is allocated an additional fixed number of slots B (e.g. five slots). This value of B may be changed using an initiator register 404 programmable by firmware. An additional allocation C is computed based on the number of active devices for the source port (see reference character 220 in FIG. 2 and 406 in FIG. 4). For example, a lookup table 412 or a multiplication factor programmable by firmware may be used to convert the number of active devices on the source port (as represented in register 406) to an additional number of slot allocations. An additional allocation D may be added using a tweak register 410 programmable by firmware. For every port, the final slot allocation 408 is computed as A+B+C+D in a summing circuit and is stored in a slot allocation counter.

Using frame-based switch 100 of FIG. 1 as an example, and assuming A=1, B=5, the lookup table provides two allocations for every active device to compute the C value, and D=2, then if during the last sampling window Port 1 connected HBA 104 had one active device, Port 2 connected to JBOD 108 had 10 active devices, Port 3 connected to JBOD 110 had 20 active devices, and Port 4 connected to frame-based switch 102 had 30 active devices, the slot allocation 408 for Port 1 would be:

Port 1 slot allocation:

$$\text{Port 1 slot allocation} = A + (1*B) + (\text{active device count register}*2) + D$$
$$= 1 + 5 + (1*2) + 2$$
$$= 10.$$

The slot allocation 408 for Port 2 would be: $= A + (0*B) +$
$$(\text{active device count register}*2) + D$$
$$= 1 + 0 + (10*2) + 2$$

the slot allocation 408 for Port 3 would be:

$$\text{Port 3 slot allocation} = A + (0*B) + (\text{active device count register}*2) + D$$
$$= 1 + 0 + (20*2) + 2$$
$$= 43;$$

and the slot allocation 408 for Port 4 would be:

$$\text{Port 4 slot allocation} = A + (0*B) + (\text{active device count register}*2) + D$$
$$= 1 + 0 + (30*2) + 2$$
$$= 63;$$

After the slot allocation 408 has been determined for each port, the router in the frame-based switch may use this slot allocation information to make source port/destination port fairness window allocations. The connection request ratios per fairness-window with Port 1 as the destination port would be:

$$\text{Total Port 1 fairness window ratios} = \text{Port 2 slots}:$$
$$\text{Port 3 slots}:\text{Port 4 slots}$$
$$= 23:43:63;$$

the connection request ratios per fairness window with Port 2 as the destination port would be:

$$\text{Total Port 2 fairness window} = \text{Port 1 slots}:\text{Port 3 slots}:\text{Port 4 slots}$$
$$= 10:43:63;$$

the connection request ratio per fairness window with Port 3 as the destination port would be:

$$\text{Total Port 3 fairness window} = \text{Port 1 slots}:\text{Port 2 slots}:\text{Port}:\text{slots}$$
$$= 10:23:63;$$

and the connection request ratios per fairness window with Port 4 as the destination port would be:

$$\text{Total Port 4 fairness window} = \text{Port 1 slots} : \text{Port 2 slots} : \text{Port 3 slots}$$
$$= 10 : 23 : 43.$$

Each connection request is processed on a first-come, first-served basis. In other words, for each request or response received at a particular port, the router will make the connection appropriate for that request or response in the order in which it was received, but only if the source port and destination port for that request or response is not being used in another connection, and the slot allocation for that particular source port/destination port pair is nonzero. Every time a source port/destination port connection is made, the router decrements the slot allocation counter for that particular source port/destination port pair by one. When the slot allocation counter for that particular source port/destination port pair reaches zero, no further connections can be made from the source port to the destination port during the remainder of the fairness window. However, because slot allocations are directional, a connection originating from the destination port to the source port can still be serviced during the remainder of the fairness window as long as the slot allocation value for that port pair is non-zero. For example, if a Port2/Port1 pair slot allocation reaches zero during a fairness window, no further connections can be made from Port2 to Port1 during the fairness window, but as long as the Port1/Port2 pair slot allocation is non-zero during the fairness window, connections can still be made from Port1 to Port2.

If the connection cannot be made for this reason or any reason, the request or response is placed in a queue for processing at a later time.

Figure 5:
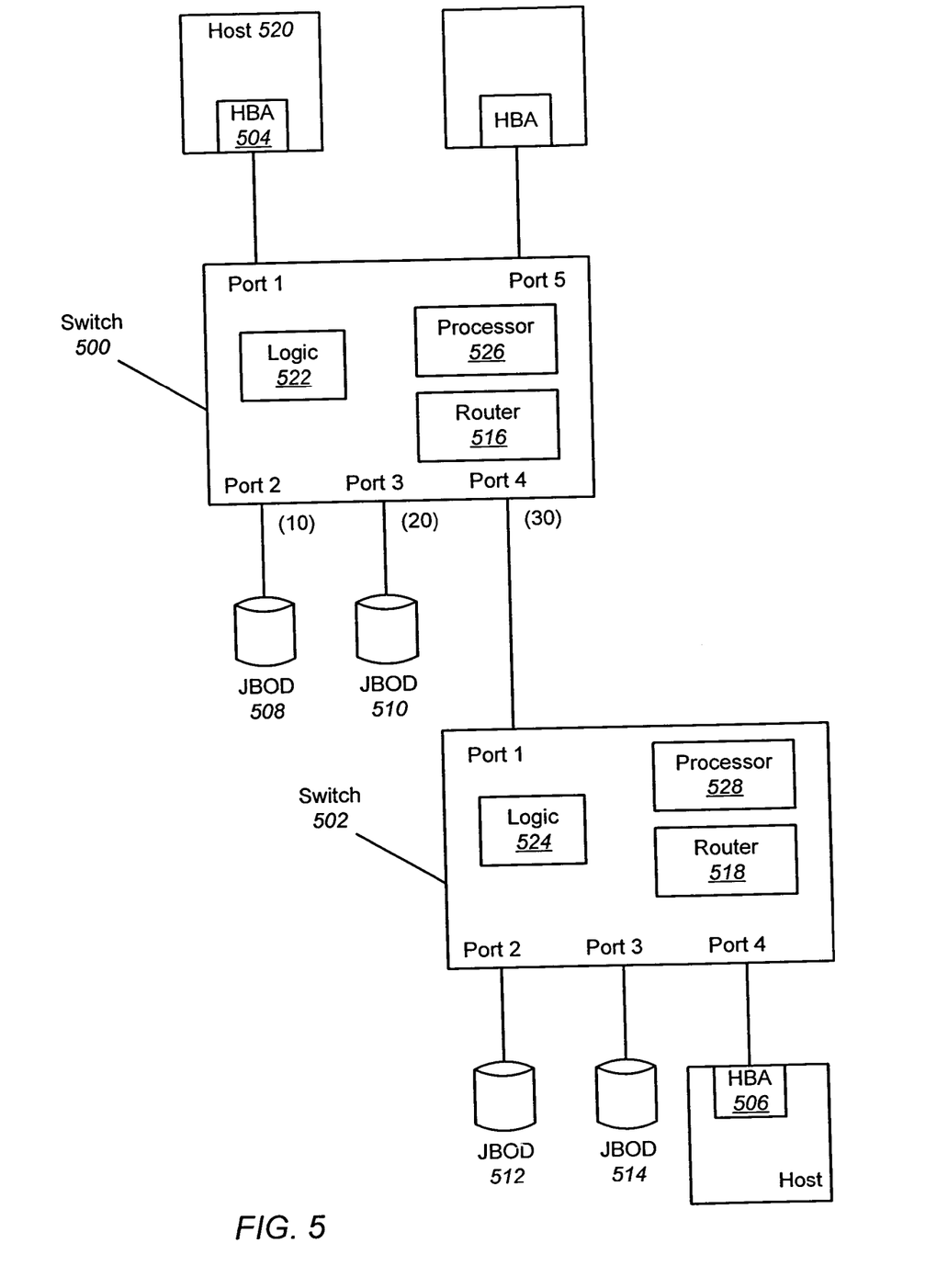
FIG. 5 is an exemplary interconnection diagram of a storage system utilizing non-blocking frame-based crossbar switches for implementing embodiments of the present invention.

FIG. 5 is an exemplary interconnection diagram of a storage system utilizing non-blocking frame-based crossbar switches for implementing embodiments of the present invention. As described above, the table associated with Port 4 will have a slot allocation of 63 (see calculation above). Frames received from any of the 30 devices connected to Port 4 will assume the slot allocation of 63 for fairness window calculations regardless of whether the 30 devices communicated with the initiator connected to Port 1 or Port 5. However, it may be the case that Port 1 historically (in the last sampling window) received frames from the devices in JBODs 512 and 514, while Port 5 received frames from JBODs 508 and 512. Thus, some unfairness may result as Port 4 requests to Port 5 are given access slots proportional to 30 drives, rather than the 15 drives Port 5 is actively communicating with, while Port 2 on switch 500 is given the correct number of slots for the 10 attached drives. This effectively would result in JBOD 512 disks being given 2 access slots per fairness window for every 1 access slot for JBOD 508 when communicating with the initiator on Port 5.

Figure 6:
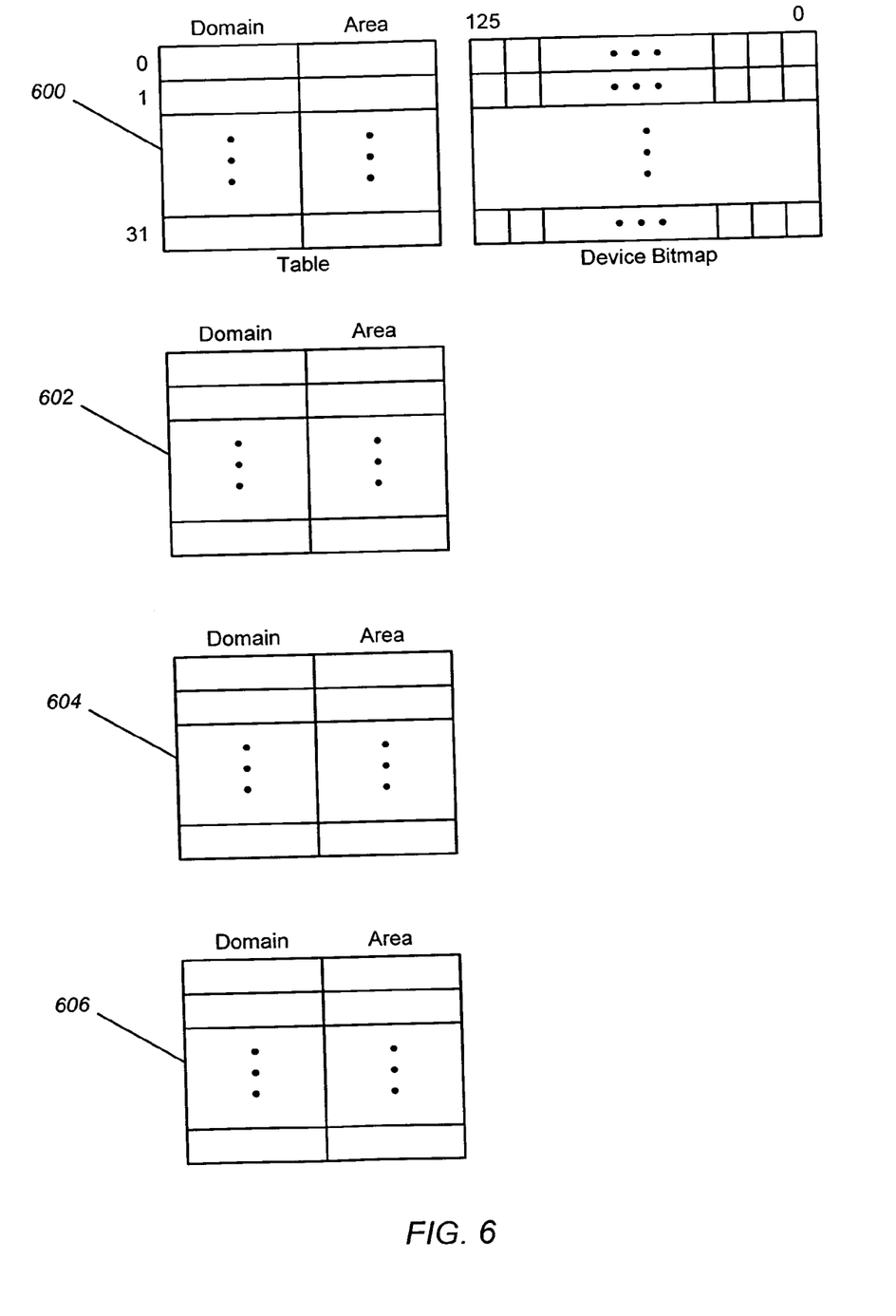
FIG. 6 is an exemplary illustration of four active device count circuits maintained for a single port according to an alternative embodiment of the present invention.

To improve the fairness of the preceding embodiment, in a second embodiment of the present invention, during a sampling window additional active device count circuits for each port could track the source domain and areas for frames received from all other ports. FIG. 6 is an exemplary illustration of four active device count circuits 600, 602, 604 and 606 maintained for a single port according to this second embodiment of the present invention. Active device count circuit 600 is similar to the active device count circuit shown in FIG. 2. Active device count circuits 602, 604 and 606 may be additionally maintained to track the source and domain and areas for frames received from all other ports. Because the router knows what source domain and areas communicate with which ports, and the total number of domain and areas connected to a port, a ratio of allocations can be determined for each port. In the example above as described with respect to FIG. 5, a total of three source domain and areas would be tracked. Because the two domain and areas connected to JBODs on Port 4 are known to be destined for Port 1 and only one domain and area connected to JBODs on Port 4 is known to be destined for Port 5, and because two domain and areas are known to be connected to Port 4, the slot allocations for Port 4's contribution to Port 1's fairness window would include all 63 of the computed allocations (because Port 1 receives frames from both JBOD 512 and 514 through Port 4) while the contribution to Port 5's fairness window would be 50% of the computed allocations (because Port 5 receives frames from only JBOD 512 through Port 4).

In a further alternative to the second embodiment, only one of the three active device count circuits 602, 604 and 606 would be utilized to store the domain and areas of all devices sending frames to the port associated with those active device count circuits. The router would then have to be relied upon to determine not only the total number of devices connected to a port, but the particular domain and areas of the devices connected to that port. Note that this second embodiment is just one of a number of ways to improve device access fairness as compared to the first embodiment.

In a third embodiment of the present invention, all initiators are not assumed to access all ports evenly, and a slot allocation is generated for each port when viewed as a source (i.e. a source port) to each other port when viewed as a destination (i.e. a destination port) in the frame-based switch, referred to herein as a source port/destination port slot allocation. In the example of FIG. 1, where frame-based switch 100 has Ports 1-4, a source port/destination port slot allocation will be determined for the following source port/destination port pairs: Port 1/Port 2, Port 1/Port 3, Port 1/Port 4, Port 2/Port 1, Port 2/Port 3, Port 2/Port 4, Port 3/Port 1, Port 3/Port 2, Port 3/Port 4, Port 4/Port 1, Port 4/Port 2, and Port 4/Port 3. Some of these source port/destination port pairs may never occur in practice, while others will occur frequently.

To accomplish this, one active device count circuit (including one table and bitmap) as illustrated in FIG. 2 is maintained for each source port/destination port pair. For example, in the storage system of FIG. 1, Port 2 of switch 100 may maintain one table and bitmap for frames received from JBOD 108 and destined for Port 1, one table and bitmap for frames received from JBOD 108 and destined for Port 3 (although this table and bitmap could be eliminated due to the lack of frames being sent from Port 2 to Port 3), and one table and bitmap for frames received from JBOD 108 and destined for Port 4. When a frame is received from JBOD 108 at Port 2, the domain and area of the destination address is read and the table and bitmap associated with that destination address is maintained. In this way, at the end of a sampling window, the table and bitmap for each source port/destination port pair can be used to determine the precise number of active devices connected to a particular source port that communicated with a particular destination port.

FIG. 4 illustrates an exemplary slot allocation circuit for computing the source port/destination port slot allocation for a source port/destination port pair according to embodiments of the present invention. In embodiments of the present invention, at the beginning of a fairness window, the source port/destination port pair is initially allocated a fixed number of slots A (e.g. one slot). This value of A may be stored in an initial allocation register 400 programmable by firmware. If the source port is connected to a locally attached initiator, the previous initiator register (see reference character 224 in FIG.

2 and 402 in FIG. 4) will be set to a logic one and the source port is allocated an additional fixed number of slots B (e.g. five slots). This value of B may be changed using an initiator register 404 programmable by firmware. An additional allocation C is computed based on the number of active devices for the source port/destination port pair (see reference character 220 in FIG. 2 and 406 in FIG. 4). For example, a lookup table 412 or a multiplication factor programmable by firmware may be used to convert the number of active devices for the source port/destination port pair (as represented in register 406) to an additional number of slot allocations. An additional allocation D may be added using a tweak register 410 programmable by firmware. For every source port/destination port pair, the final source port/destination port slot allocation 408 is computed as A+B+C+D in a summing circuit and is stored in a slot allocation counter.

Using frame-based switch 100 of FIG. 1 as an example, and assuming A=1, B=5, the lookup table provides one allocation for every active device, and D=2, then if during the last sampling window Port 2 connected to JBOD 108 had three active devices that sent a frame to Port 1 and seven active devices that sent a frame to Port 4, the slot allocation 408 for the Port 2/Port 1 pair would be:

$$\text{Port 2/Port 1 slot allocation} = A + (0*B) +$$
$$(\text{active device count register}*2) + D$$
$$= 1 + 0 + (3*2) + 2$$
$$= 9;$$

and the slot allocation 408 for the Port 2/Port 4 pair would be:

$$\text{Port 2/Port 4 slot allocation} = A + (0*B) +$$
$$(\text{active device count register}*2) + D$$
$$= 1 + 0 + (7*2) + 2$$
$$= 17.$$

After the source port/destination port slot allocation 408 has been determined for each source port/destination port combination, the router in the frame-based switch may use this slot allocation information while making source port/destination port connections on a first-come, first-served basis. In other words, for each request or response received at a particular port, the router will read both the source and destination address and make the connection appropriate for that request or response in the order in which it was received, but only if the source port and destination port for that request or response is not being used in another connection, and the source port/destination port slot allocation for that particular source port and destination port is nonzero. Every time a source port/destination port connection is made, the router decrements the slot allocation counter for that particular source port/destination port pair by one. When the slot allocation counter for that particular source port/destination port pair reaches zero, no further connections can be made for that particular source port and destination port during the remainder of the fairness window. If the connection cannot be made for this reason or any reason, the request or response is placed in a queue for processing at a later time.

The data gathering and computations described above may be implemented in hardware in dedicated logic (see reference characters 122 and 124 in FIG. 1) in the frame-based switch. This logic may comprise gates, registers, counters, adders, state machines and the like, well understood by those skilled in the art. Some of the registers may be configurable using firmware in the frame-based switch. In alternative embodiments, the functions of the present invention described above may be performed by processors (see reference characters 126 and 128 in FIG. 1) executing software or firmware instructions.

Fairness windows are not time based, and the slot allocation counters and the fairness window may be reset (forced to end) when the router detects that any one of a number of conditions are satisfied, such as (1) if every source port/destination port slot allocation counter in the frame-based switch has reached zero, (2) if any single port's source port/destination port slot allocation counter for all destination ports has reached zero, but no other ports in the frame-based switch are making any requests or responses, or (3) if any single source port/destination port slot allocation counter has reached zero, but the destination port for the next pending request or response from the source port is free (not being utilized by another access). If one of these conditions occurs, it does not make sense to maintain the pendency of the fairness window, aid unnecessarily delay service to other ports. Therefore, in embodiments of the present invention, when one of these conditions occurs, the fairness window is reset, and slots are again allocated to the ports in the frame-based switch as described above.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A method for managing device access fairness in a frame-based switch including a plurality of ports, each port operable as a source port and as a destination port with respect to other ports, said method comprising:

for each pair of source and destination ports among the ports of the frame-based switch, counting a number of active devices connected to a source port of the pair of source and destination ports during a sampling window, said counting step further comprising determining a type of each counted active device;

determining a weighted number of slots for the pair of source and destination ports in accordance with the number and type of active devices connected to the source port of the pair of source and destination ports;

generating slot allocations for the pair of source and destination ports among the ports within the frame-based switch in accordance with the weighted number of slots during a fairness window; and     wherein the step of determining a weighted number of slots further comprises, for each pair of source and destination ports that is not a device/device pair:

allocating A slots as an initial allocation,         allocating B additional slots if the source port is an initiator,         allocating C additional slots in accordance with the number of active devices connected to the source port, and         allocating D additional slots in accordance with a tweak register.

2. The method as recited in claim 1, further comprising:

processing requests for making source port/destination port connections on a first-come first-served basis during the fairness window, each request identifying at least a source and destination port pair to be connected; and decrementing the number of slots allocated to the source and destination port pair each time a source port/destination port connection is made between the source and destination port pair.

3. The method as recited in claim 1, the step of counting a number of active devices connected to each port on the frame-based switch during a sampling window further comprising:

for each port, maintaining a table of domain and area addresses for requests or responses being received at said port, said table containing pairs of domain and area addresses, wherein in each pair the domain address identifies a particular switch and the area address identifies a particular port; and maintaining a bitmap associated with each pair of domain and area address in the table, said bitmap containing bits that represent devices connected to said port.

4. The method as recited in claim 3, the step of counting a number of active devices connected to each port further comprising:

determining if a request being received at said port is from an initiator; and if the request being received is from an initiator, storing an indication that at least one device connected to said port is an initiator.

5. The method as recited in claim 3, the step of maintaining a table of domain and area addresses for each port further comprising:

receiving a request or response at the port, said request or response identifying a domain and area address;

comparing the domain and area address of the received request or response with the domain and area addresses stored in the table; and if the domain and area address of the received request or response does not match any domain and area address stored in the table, adding the domain and area address of the received request or response to the table.

6. The method as recited in claim 5, the step of maintaining a bitmap associated with each domain and area address in the table further comprising: if the domain and area address of the received request or response matches a domain and area address stored in the table, applying an Arbitrated Loop Protocol Address (ALPA) associated with the domain and area address of the received request or response to a hash table to identify a particular bit in the bitmap associated with the compared domain and area address, and asserting that particular bit if it was not already asserted.

7. The method as recited in claim 6, further comprising: at the end of the sampling window, summing up the asserted bits in all bitmaps associated with the port to compute the number of active devices connected to the port.

8. The method as recited in claim 1, the step of determining a weighted number of slots further comprising, for each source port/destination port pair that is a device/device pair:

allocating A slots as an initial allocation; and allocating D additional slots in accordance with a tweak register.

9. The method as recited in claim 1, further comprising resetting the fairness window if:

every source port/destination port slot allocation is zero, or all source port/destination port slot allocations for a particular source port is zero, but no other ports in the frame-based switch are making any requests or responses, or if any source port/destination port slot allocation is zero, but the destination port for a next pending request or response from the source port is free.

10. An apparatus for managing device access fairness in a frame-based switch including a plurality of ports, each port operable as a source port and as a destination port with respect to other ports, comprising:

a sampling window counter for generating a sampling window;

an active device count circuit for counting a number of active devices connected to a source port of each pair of source and destination ports during a sampling window, said counting step further comprising determining a type of each counted active device;

a slot allocation circuit for generating slot allocations for each pair of source and destination ports among the ports within the frame-based switch in accordance with a weighted number of slots assigned for each pair of source and destination ports during a fairness window, wherein the weighted number of slots for each pair of source and destination ports is determined by the number and type of active devices connected to the source port of the pair of source and destination ports, the slot allocation circuit further comprising:

an initial allocation register for storing A slots as an initial allocation;

an initiator register for storing B slots if the source port is an initiator;

a lookup table for receiving the number of active devices connected to the source port as an input and generating and storing C slots;

a tweak register for storing D slots for compensation; and a summing circuit for summing A, B, C and D to compute the weighted number of slots for each source port/destination port pair that is not a device/device pair.

11. The apparatus as recited in claim 10, further comprising:

a router processing requests for making source port/destination port connections on a first-come first-served basis during the fairness window, each request identifying at least a source and destination port pair to be connected; and the slot allocation circuit further configured for decrementing the number of slots allocated to the source and destination port pair each time a source port/destination port connection is made between the source and destination port pair.

12. The apparatus as recited in claim 10, the active device count circuit further comprising:

for each port, a table of domain and area addresses for requests or responses being received at said port, said table containing pairs of domain and area addresses, wherein in each pair the domain address identifies a particular switch and the area address identifies a particular port; and a bitmap associated with each pair of domain and area address in the table, said bitmap containing bits that represent devices connected to said port.

13. The apparatus as recited in claim 12, the active device count circuit further comprising:

logic for determining if a request being received at said port is from an initiator; and a current initiator register and a previous initiator register for storing an indication that that at least one device connected to said port is an initiator if the request being received is from an initiator.

14. The apparatus as recited in claim 12, the active device count circuit further comprising: a comparator circuit for comparing the domain and area address of the received request or response with the domain and area addresses stored in the table, and adding the domain and area address to the table if the domain and area address of the received request or response does not match any domain and area address stored in the table.

15. The apparatus as recited in claim 14, the active device count circuit further comprising a hash table and further configured for: if the domain and area address of the received request or response matches a domain and area address stored in the table, applying an Arbitrated Loop Protocol Address (ALPA) associated with the domain and area address of the received request or response to a hash table to identify a particular bit in the bitmap associated with the compared domain and area address, and asserting that particular bit if it was not already asserted.

16. The apparatus as recited in claim 15, further comprising: a summing circuit for summing up the asserted bits in all bitmaps associated with the port at the end of the sampling window to compute the number of active devices connected to the port.

17. The apparatus as recited in claim 10, the summing circuit for summing A and D to compute the slot allocation for each source and destination port pair that is a device/device pair.

18. The apparatus as recited in claim 10, the router configured for resetting the slot allocation counters and the fairness window if every source port/destination port slot allocation is zero, or all source port/destination port slot allocations for a particular source port is zero, but no other ports in the frame-based switch are making any requests or responses, or if any source port/destination port slot allocation is zero, but the destination port for a next pending request or response from the source port is free.

19. A frame-based switch comprising the apparatus of claim 10.

20. A storage system comprising the frame-based switch of claim 19.

* * * * *